United States Patent [19]
Filion et al.

[11] Patent Number: 5,567,375
[45] Date of Patent: Oct. 22, 1996

[54] METHOD FOR CASTING A THERMOPLASTIC AUTOMOTIVE AIR BAG COVER SKIN WITH A LESSER STRENGTH THERMOPLASTIC TEAR SEAM STRIP INSERT

[75] Inventors: Scott M. Filion, Newmarket; John D. Gray, Union; William M. Humphrey, Dover, all of N.H.

[73] Assignee: Davidson Textron Inc., Dover, N.H.

[21] Appl. No.: 465,306

[22] Filed: Jun. 5, 1995

[51] Int. Cl.⁶ .................... B29C 41/18; B29C 47/00
[52] U.S. Cl. ............ 264/251; 264/177.17; 264/265; 264/266; 264/302
[58] Field of Search ................ 264/259, 265, 264/266, 301, 302, 306, 251, 247, 255, 177.17

[56] References Cited

U.S. PATENT DOCUMENTS

| | | | |
|---|---|---|---|
| 4,369,152 | 1/1983 | Gray et al. | 264/251 X |
| 4,783,302 | 11/1988 | Kurimoto | 264/251 |
| 5,256,354 | 10/1993 | Chadwick | 264/302 X |
| 5,288,103 | 2/1994 | Parker et al. | 280/728 |
| 5,443,777 | 8/1995 | Mills | 264/265 X |
| 5,458,361 | 10/1995 | Gajewski | 264/255 X |
| 5,466,412 | 11/1995 | Parker et al. | 264/301 X |

Primary Examiner—Karen Aftergut
Attorney, Agent, or Firm—Reising, Ethington, Barnard & Perry

[57] ABSTRACT

Method and apparatus including a powder box and heatable shell tool are disclosed for forming a thermoplastic automotive air bag cover skin with a lesser strength thermoplastic tear seam strip insert wherein the latter is initially formed with a protruding rib on one side and a pointed ridge on an opposite side. A heat resistant elastomeric transfer socket attached to the powder box interior receives and holds the insert rib and thereby the insert in a prescribed tear seam configuration and then positions the tear seam strip insert against a heated skin defining mold surface on the shell tool when the powder box is joined with the latter. The skin is formed by casting thermoplastic powder from the powder box against the heated mold surface and about the tear seam insert. The pointed ridge of the tear seam strip insert is pressed with a limited force against the heated mold surface by the transfer socket and prevents air entrapment between the tear seam strip insert and mold surface as the insert melts and joins with a surrounding layer of powder melt that forms the skin on cooling. In the process of melting, the pointed edge of the ridge and all of the rib of the insert melts and becomes part of a tear seam where the insert fuses with the skin while conforming to the mold surface to smoothly blend with the outer side of the skin while the backside of the insert smoothly blends with the surrounding inner side of the skin.

7 Claims, 2 Drawing Sheets

METHOD FOR CASTING A THERMOPLASTIC AUTOMOTIVE AIR BAG COVER SKIN WITH A LESSER STRENGTH THERMOPLASTIC TEAR SEAM STRIP INSERT

TECHNICAL FIELD

This invention relates to thermoplastic automotive air bag cover skins that include an air bag deployment tear seam and more particularly to method and apparatus for manufacturing same.

BACKGROUND OF THE INVENTION

In thermoplastic automotive air bag cover skins having an air bag deployment tear seam that is torn by the force of an inflating air bag to form an opening in the skin for deployment of the air bag, it is important that the skin not fragment along the edge of the opening created therein as such fragments could then enter the passenger compartment. Polyvinyl chloride (PVC) is for a number of well known reasons commonly used to form an automotive instrument panel shell or skin that includes a cover portion covering a passenger side air bag. However, PVC normally becomes brittle at about −20° C. and an air bag cover skin formed of this material and having such a tear seam is prone to fragment at the tear seam when the seam is torn for air bag deployment at temperatures falling below this level.

To avoid a possible fragmentation problem associated with a tear seam in a PVC air bag cover skin at extremely low temperatures, an entirely separate air bag deployment door may be added to the air bag cover. However, this can substantially add to the cost as compared to a relatively simple tear seam formed in the air bag cover skin and then there are the fit and finish considerations associated with this approach that can further increase the cost. Moreover, such a separately added air bag door is more prone to being damaged accidently or tampered with intentionally as compared to an integral air bag door defined by a tear seam in the cover skin. Furthermore, a separately added door is not suited to hiding its presence and thereby the presence of an air bag system whereas a tear seam in the cover skin can be hidden from view where such is desired by the automobile manufacturer.

The effect of embrittlement of PVC at extremely low temperatures when used to form an air bag cover skin having an air bag deployment tear seam can be minimized by a formed in place tear seam strip of lesser strength PVC or polyolefin material as disclosed in U.S. Pat. No. 5,288,103. In the manufacture thereof, a narrow tear seam gap defining gasket is pressed against the mold surface of a shell tool that defines the outer side of the skin. The skin is then formed in a casting process wherein the shell tool is heated and PVC powder including a suitable plasticizer and selected colorant is then cast from a powder box secured to the shell tool and onto the heated mold surface and about the gasket by inverting the shell tool and powder box. Upon formation of the skin to a controlled thickness on the mold surface, the shell tool and powder box are returned together to their former position wherein the then uprighted powder box retains the unused powder. The gasket is then removed with the powder box from the shell tool, the shell tool alone is rotated so that its mold surface faces upwardly, and the remaining gap left in the skin by the gasket is then filled by spraying the gap with a lesser strength thermoplastic material such as a highly glass filled or carbonate or other filled thermoplastic PVC or polyolefin material while the skin remains on the heated mold surface. The lesser strength PVC or polyolefin material is provided with the same color as the skin and on solidifying and curing on the mold surface forms a narrow tear seam strip in the skin that is substantially more frangible than the surrounding skin and wherein the skin including the tear seam strip may be covered with a coating of paint where the color match is not sufficient to make the tear seam invisible. The formed in place tear seam strip limits the potential fracture zone in the skin covering the air bag as compared to a tear seam formed by a groove in the skin as the skin in the latter case is more prone to fracture into segments or particles along and outward of the tear seam groove because of cold embrittlement.

In arriving at the method and apparatus of the present invention, it was recognized that while a formed in place PVC or polyolefin tear seam strip can provide satisfactory performance (i.e. no significant fragmentation) down to temperatures as low as about −20° C., the use of PVC and polyolefin material limits low temperature tear seam performance capability as compared to thermoplastic urethane (TPU) that could extend such performance down to a much lower temperature of about −40° C. However, thermoplastic urethane in a highly weakened form produced by a filler (referred to herein as a "filled TPU") is not well suited from a conventional processing standpoint to forming a tear seam strip in place in a powder cast PVC skin like in the above U.S. Pat. No. 5,288,103 or in a powder cast TPU skin because the filled TPU does not melt when using standard sprayed tear seam techniques. It was discovered that the combination of a suitably filled TPU tear seam strip insert with a PVC skin but more preferably with a TPU skin has the potential for significantly reducing the possibility of any fragmentation of the tear seam strip and the surrounding skin at extremely cold temperatures where a PVC skin with a formed in place PVC or polyolefin tear seam strip can not provide satisfactory performance. The tear seam may have various configurations such as a H, U or X-shape and the problem then is how to efficiently and cost effectively include in the casting of the skin, such a filled TPU tear seam strip insert of various configurations, or for that matter a filled PVC or polyolefin tear seam strip insert of various configurations where the low temperature operating requirements are less extreme. Moreover, it was found that this problem is compounded by the discovery that air can become entrapped between the heated mold surface and such an insert and result in highly undesirable cavities or pits in the outer surface of the insert.

SUMMARY OF THE PRESENT INVENTION

The present invention is in method and shell tool and powder box casting apparatus for efficiently and cost effectively manufacturing a thermoplastic automotive air bag cover skin (also called a shell) having a lesser strength or relatively weak thermoplastic tear seam strip insert wherein the insert may have various configurations and air entrapment is prevented between the heated mold surface on the shell tool and the insert in whatever insert configuration while the skin is formed thereabout by casting thermoplastic powder from the powder box onto the heated mold surface. In the present invention, the insert is processed from extruded stock and temporarily attached to the interior of the powder box and held in accurate location against the skin defining mold surface of the shell tool by a heat resistant elastomeric transfer socket that is permanently attached to the interior of the powder box and is used to configure as well as hold the insert. For extreme low temperature tear seam performance, the skin is preferably formed with TPU powder and the extruded insert strip is formed with filled TPU. Where the low temperature tear seam operating requirements for the air bag cover skin are less severe, the skin can be formed with some other suitable thermoplastic material such as PVC powder and the extruded tear seam strip insert stock can be formed with filled TPU, or filled PVC or filled polyolefin material as in the above mentioned patent.

The transfer socket is made from an extruded strip of heat resistant elastomeric material such as silicone rubber that can withstand the casting temperature environment. The extruded transfer socket strip is formed with a uniform cross section that includes a pattern surface with a longitudinally extending insert retaining groove located centrally thereof and a base portion that parallels the pattern surface. A piece of the extruded transfer socket strip of suitable length is secured at its base portion to the interior of the powder box with a retainer and elevated platform so as to form the transfer socket with the desired tear seam configuration and a contour matching the mold surface of the shell tool at the tear seam location and so as to locate the transfer socket at a prescribed uniform distance from the mold surface of the shell tool when the powder box is connected to the latter.

The extruded tear seam strip stock is formed with a symmetrical cross section that includes a pointed ridge that forms the outer side of the insert and a rib that protrudes from an inner side of the insert and parallels the pointed ridge. The retaining groove in the transfer socket is adapted to tightly receive the rib on the extruded tear seam strip stock and the tear seam insert is formed by installing a piece of this stock of suitable length on the transfer socket by forcing the protruding rib on the former into the retaining groove in the latter whereby this piece is forced by the pattern surface and the retaining groove on the transfer socket to conform to the prescribed insert shape and is then held in this condition by the transfer socket on the powder box and for movement into engagement with the mold surface of the shell tool.

With the tear seam strip insert thus preformed of a selected filled thermoplastic material and held by the transfer socket on the powder box, it is then accurately located and pressed at its pointed ridge by the transfer socket against the preheated mold surface of the shell tool on connection of the powder box to the latter. The skin is then formed by casting a selected thermoplastic powder in the powder box against the heated mold surface and about the tear seam insert. The pointed ridge of the tear seam strip insert is pressed with a limited low force against the heated mold surface by the transfer socket so as to be only slightly deformed on initial contact and prevents air entrapment between the tear seam strip insert and mold surface as the insert melts and joins with a surrounding layer of powder melt that forms the skin on cooling. In the process of melting the powder layer, the point of the ridge and the rib of the insert are melted to become part of a tear seam where the insert is caused to conform along a narrow width thereof to the mold surface to thereby smoothly blend with the surrounding outer side of the skin while the backside of the insert is caused to smoothly blend with the surrounding inner side of the skin and while the remaining body of the insert fuses with the surrounding body of the skin.

The extruded elastomeric stock used to form the transfer socket and the extruded lesser strength thermoplastic stock used to form the tear seam strip insert coupled with the transfer socket retainer and the elevated platform provide a wide degree of manufacturing flexibility in forming various prescribed skin shapes with various prescribed tear seam patterns and with various thermoplastic skin and tear seam materials suited to meeting certain low temperature tear seam operating requirements as well as other requirements that are normally required of the skin such as resistance to ultraviolet rays. An obvious advantage in this method of incorporating a tear seam insert in the air bag cover skin is that the skin or shell including the tear seam is completely formed in the casting and curing of the skin rather than having to then perform an additional processing operation to include the tear seam as is the case with a tear seam that is formed in place on the mold surface of the shell tool following the formation of the skin.

It is therefore an object of the present invention to provide a new and improved method and thermoplastic powder casting apparatus for casting an automotive air bag cover skin with an air bag deployment tear seam insert of thermoplastic material of lesser strength than the skin.

Another object is to provide method and apparatus for forming an automotive air bag cover skin of thermoplastic material with an air bag deployment tear seam insert that is also formed of thermoplastic material but of lesser strength wherein the insert is transferred to a heated mold surface on which the skin is to be cast by a heat resistant elastomeric transfer socket that temporarily retains and holds the insert in a prescribed tear seam configuration as the skin is cast.

Another object is to provide an elastomeric tear seam transfer socket for holding a tear seam insert formed of a filled thermoplastic material in a prescribed tear seam configuration and with respect to a powder box and then accurately positioning the tear seam insert against a heated mold surface of a shell tool when the powder box is secured to the shell tool and a full strength thermoplastic material in powder form is cast against the mold surface to form a skin that fuses with the insert.

Another object is to provide a tear seam insert formed of a filled thermoplastic material and with a shape that includes an air entrapment preventing temporary pointed ridge on an outer side and a protruding temporary rib on an inner side, and a heat resistant elastomeric tear seam transfer socket for holding the tear seam insert with the rib in a prescribed tear seam configuration and with respect to a powder box and then positioning the tear seam insert with its pointed ridge against the heated mold surface of an air bag cover shell tool when the powder box is secured to the shell tool and thermoplastic powder is cast against the mold surface to form a skin that fuses with the insert while both the point of the ridge and the rib of the insert melt to become part of a tear seam such that the inner and outer sides of the insert smoothly blend with those of the skin.

Another object is to provide an extruded thermoplastic tear seam insert having an air entrapment preventing ridge of single pointed configuration on an outer side and a rib on an inner side, and a heat resistant elastomeric tear seam transfer socket of silicon rubber for holding the tear seam insert by the rib in a prescribed tear seam configuration and with respect to a powder box and then positioning the tear seam insert so that its pointed ridge is held under slight pressure against the mold surface of a heated shell tool when the powder box is secured to the latter and thermoplastic powder is cast against the heated mold surface to form an air bag cover skin while the pointed ridge prevents air entrapment between the heated mold surface and the insert as both the point of the ridge and the rib melt and the insert fuses as a tear seam that smoothly blends with the skin on both its inner and outer sides as the skin is formed on the heated mold surface about the insert.

DETAILED DESCRIPTION OF THE DRAWINGS

Figure 1:
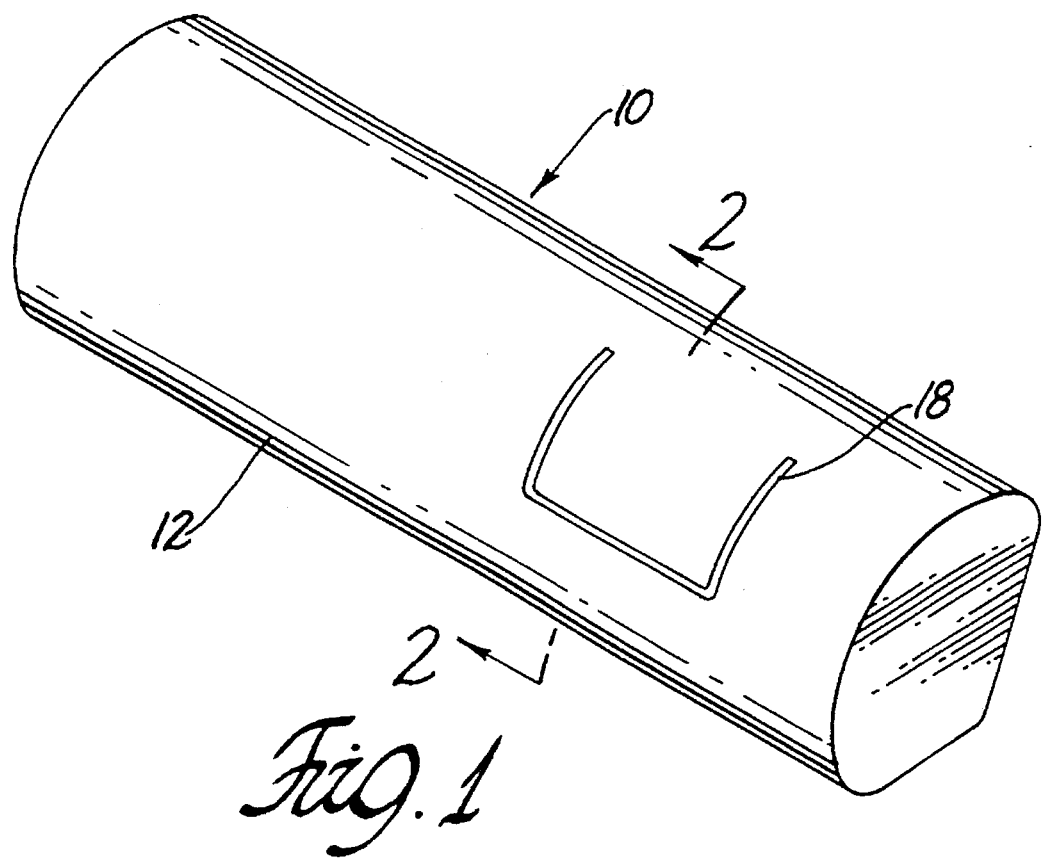
FIG. 1 is a perspective view of an automotive air bag cover having a skin including air bag deployment tear seam insert made with the casting apparatus in FIGS. 3–5.
Figure 2:
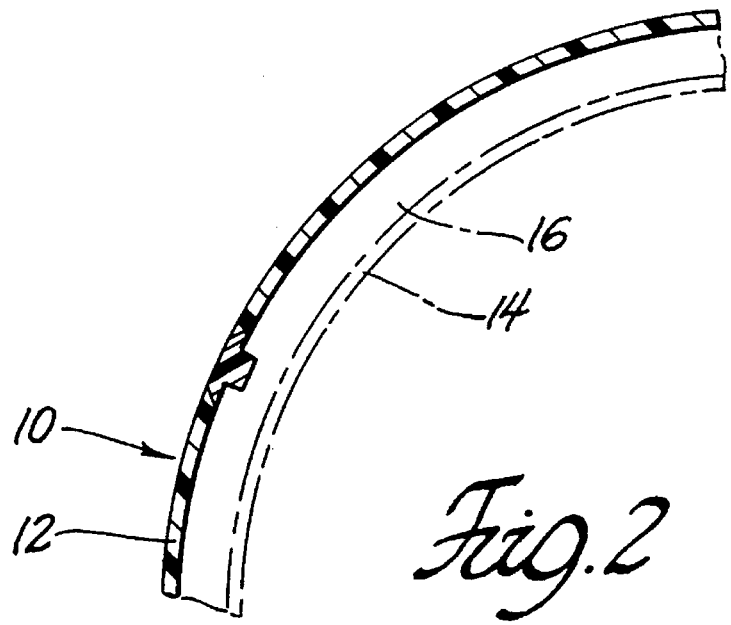
FIG. 2 is a view taken along the line 2—2 in FIG. 1 when looking in the direction of the arrows.

Referring to FIGS. 1 and 2, there is illustrated an automotive air bag cover 10 comprising a thin elastic skin or shell 12 formed of thermoplastic material such as TPU or PVC, a rigid substrate or retainer 14 that can be formed of plastic or metal, and a soft intermediate layer 16 that can be formed of urethane foam and is located between and bonded to the skin and substrate ( the foam layer and substrate being shown in phantom line in FIG. 2). The cover 10 is intended to form a part of an instrument panel on the passenger side of an automobile and hide an air bag system (not shown) of a suitable conventional type that is located there behind. The skin 12 has a U-shaped tear seam 18 and the substrate 14 includes a door (not shown) of a suitable type that is opened directly by the force of the inflating air bag and tears a section of the foam layer along with the tear seam in the skin in a well known manner to create an opening in the cover through which the air bag can deploy for passenger protection. It will also be understood that the tear seam pattern illustrated is only one of several common patterns that may be used and which further include ones of H and X-shape and wherein there may be several doors in the substrate to complement the latter tear seam pattern configurations. An example of an air bag cover with a skin having an H-shaped tear seam, double doors in the substrate, and an air bag system located there behind is disclosed in the above mentioned U.S. Pat. No. 5,288,103 which is assigned to the assignee of this invention and which is hereby incorporated by reference. And it will be further understood that both the foam layer and the substrate including the door may be formed of any suitable material and processed in any suitable manner as they form no part of the invention and are only intended to illustrate structural support for the skin 12 and its application to an air bag cover.

Figure 3:
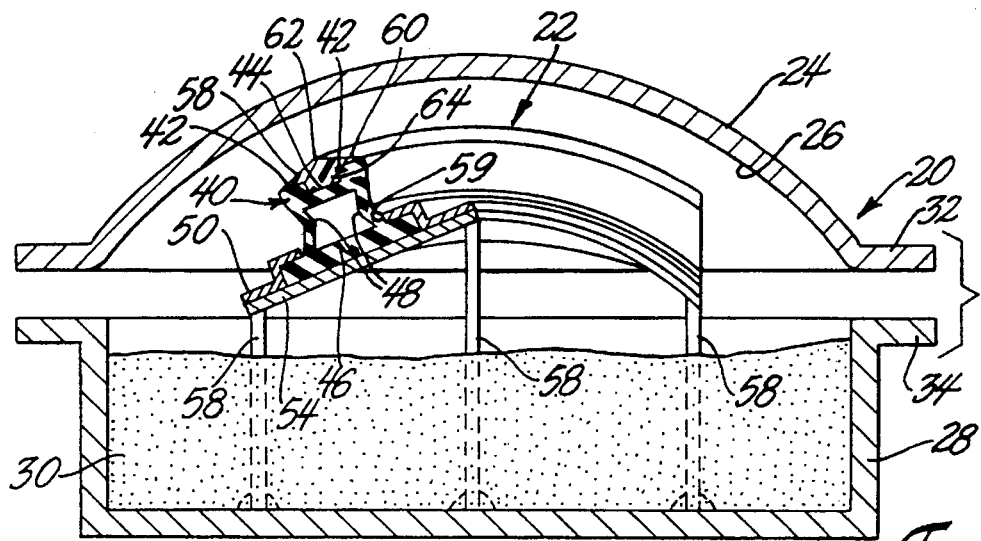
FIG. 3 is an exploded sectional view of casting apparatus for making the skin with tear seam insert in FIG. 1.
Figure 4:
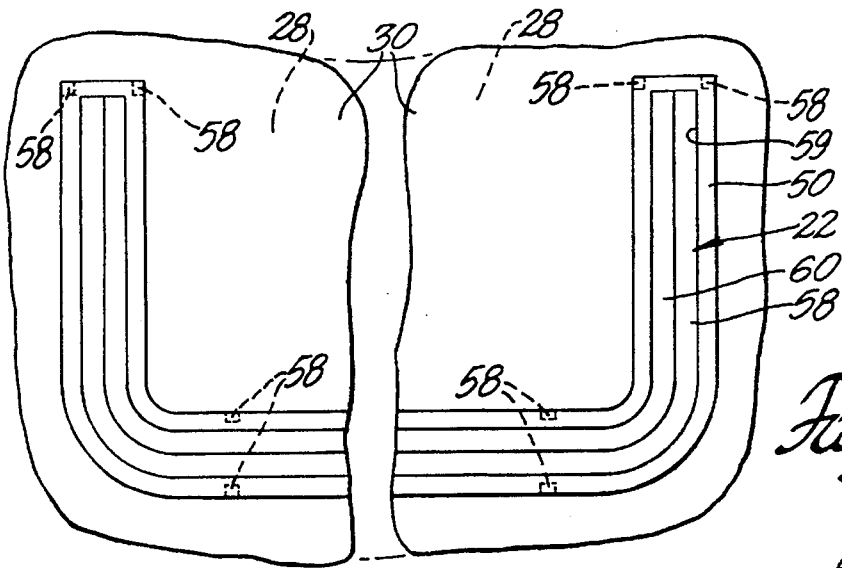
FIG. 4 is a view taken along the line 4—4 in FIG. 3 when looking in the direction of the arrows.
Figure 5:
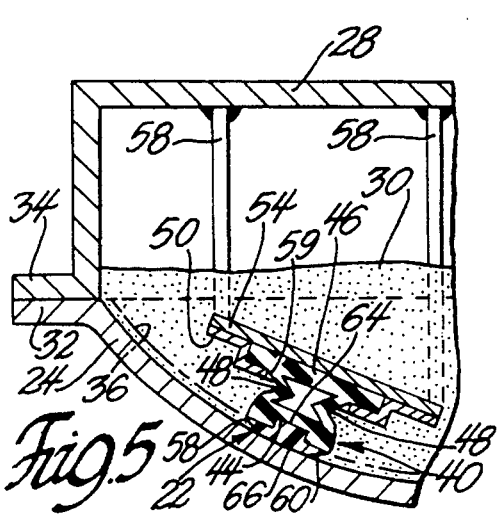
FIG. 5 is partial view of the apparatus in FIG. 3 showing the powder box and shell tool clamped together and inverted to a casting position.

The skin 12 including the tear seam 18 is formed with the thermoplastic powder casting apparatus 20 illustrated in FIGS. 3–5 in a dry powder casting process wherein a preformed tear seam insert 22 formed of lesser strength or relatively weak thermoplastic material as compared to the skin is used to form the tear seam in the skin during formation of the latter. As to the strength of the insert, the material forming the latter provides it with a tensile strength that is substantially less than that of the skin and of a suitable magnitude that will assure its shearing by the force of a typical inflating air bag as is well known in the art. The apparatus 20 generally comprises a heatable shell tool 24 having a mold surface 26 for forming the skin to the shape shown in FIG. 1 and a powder box 28 for containing a measured amount of thermoplastic powder 30 that includes a suitable plasticizer and selected colorant and is cast against the mold surface when the latter is heated to form the skin thereon.

Figure 6:
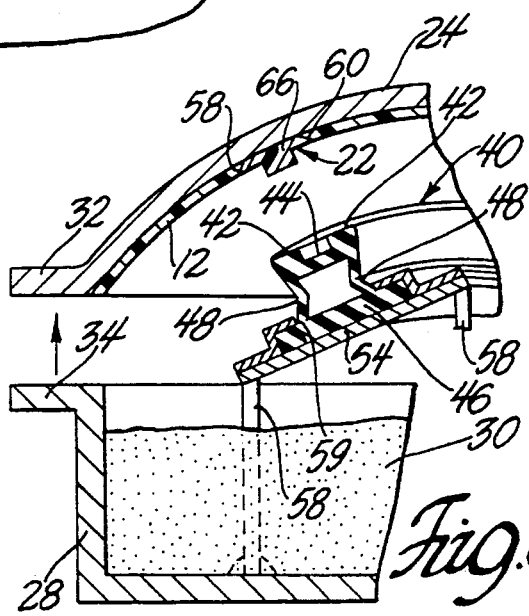
FIG. 6 is a partial exploded view of the apparatus showing the powder box and shell tool inverted following the casting of the skin with the insert molded in place.

The shell tool 24 is constructed in a manner that is well known in the art with the mold surface having a thin coating of nickel that imparts a desired grain texture to the outer side of the skin which is commonly referred to as the "Class A" side. The shell tool 24 and powder box 28 have mating peripheral flanges 32 and 34 respectively by which they are adapted to be sealing secured together by a suitable clamping arrangement (not shown) in a well known manner following charging of the powder box with the selected powder while the powder box is in an upright and open position as shown in FIG. 3. The shell tool 24 is adapted to be heated by a suitable temperature controlled heating system in a well known manner in a powder casting process wherein the shell tool is heated to a certain temperature such as 350° F. that will melt the powder, the shell tool and powder box are then clamped together and inverted or rotated to the casting position shown in FIG. 5 to cast the powder onto the heated mold surface, and this position and degree of heat is held for a prescribed period of time such as one minute or less to melt a layer 36 of the powder of prescribed thickness to eventually form the skin to a controlled thickness such as about 0.040". The temperature of the shell tool is then reduced to solidify the molten layer, and the shell tool together with the powder box are inverted again to return the unused powder to the latter whereafter the shell tool and powder box are eventually separated as shown in FIG. 6 following curing of the skin to permit demolding of the skin from the mold surface and recharging of the powder box.

The apparatus and formation of the skin as thus far described (i.e. without the tear seam insert 22) is well known in the art. In accordance with the present invention, the tear seam insert 22 is temporarily attached to the interior of the powder box and held in accurate location and in a prescribed configuration (in this case a U-shape) against the skin defining mold surface of the shell tool by a heat resistant elastomeric transfer socket 40 that is attached to the interior of the powder box and is made from an extruded strip of heat resistant elastomeric material such as silicone rubber that can withstand 650° F. The extruded transfer socket strip stock is formed at one side with a pattern surface 42 and with an insert retaining groove 44 of rectangular cross section that is located centrally of this surface. The extruded transfer socket strip stock is formed at an opposite side with a base portion 46 of rectangular cross section that parallels the pattern surface 42. The transfer socket strip stock is also formed with a hollow section between these sides having oppositely facing inwardly angled walls 48 that extend between these sides and are operable to bend inwardly to limit the force that can be transmitted across the transfer socket between its base 46 and pattern surface 42 and thereby to the tear seam insert as described in further detail latter.

With a U-shaped tear seam pattern prescribed for the desired tear seam in the skin, a rigid slotted retainer 50 is formed to this configuration and a piece of the extruded transfer socket strip stock of suitable length is used to form the transfer socket 40 in the prescribed U-shaped configuration. This is accomplished by bending the stock to prescribed configuration and securing it in this position at its base portion 46 by a contoured slotted retainer 50 to a contoured platform 54 that is attached by legs 58 of various lengths to the interior of the powder box at the bottom of the latter. The retainer 50 is received over the transfer socket 40 with its hollow section extending through the slot 59 in the retainer to position the pattern surface 42 and groove 44 outward thereof and the retainer is attached to the platform 54 and the legs 58 of the latter are attached to the powder box by any suitable means including welding as shown or threaded fasteners such as machine screws and bolts. The platform 54 has an outline of U-shape to conform to that of the selected tear seam pattern but is larger so as to provide for the support and attachment of the retainer 50 as well as support of the transfer socket 40. See FIG. 4. In addition, the platform has a center line contour that parallels the mold surface of the shell tool along the center line of the prescribed tear seam strip location when the powder box is aligned with the shell tool. See FIG. 3. For the purposes intended of the retainer and platform as described below, only the center line contour along their length need parallel the mold surface to adequately conform the insert to the prescribed contour or they may be completely contoured transversely or width wise to the shape of the mold surface with a resulting more complex curvature. The transfer socket 40 is retained directly on the platform 54 by the retainer 50 and thereby parallel to the prescribed tear seam location on the mold surface and thus the platform co-operates with the retainer to form and hold the transfer socket in the prescribed shape. And the platform distance from the powder box bottom is determined by the length of the legs 58 so that the pattern surface 42 on the transfer socket 40 is located by the platform 54 at a prescribed uniform distance from the tear seam location on the mold surface of the shell tool when the powder box is connected therewith. This prescribed uniform distance is determined by the thickness of the insert measured from the pattern surface of the transfer socket to the outermost extremity of the insert and by the amount of limited force or preload intended to be applied thereto to hold the insert against the mold surface as described below.

The tear seam strip insert 22 is processed from an extruded strip of filled thermoplastic material having a tensile strength that is substantially less than that of the skin so that it will assuredly shear or tear from the force of air bag inflation. For example, the insert material may have about half or 50% the tensile strength of the skin to assure tearing from this force. An example of a suitable filled thermoplastic urethane material for the insert in meeting extreme low temperature tear seam operating requirements is disclosed in U.S. patent application Ser. No. 08/465,551 entitled "Filled Aliphatic Thermoplastic Urethane Automotive Air Bag Door Tear Seam Insert" and assigned to the assignee of this invention and filed concurrently with this application and which is hereby incorporated by reference. Other examples for meeting less extreme low temperature requirements are a filled PVC or polyolefin material as disclosed in the above U.S. Pat. No. 5,288,103.

The thermoplastic insert material is extruded in a conventional manner well known in the art and so as to have a symmetrical arrow head-shaped cross section comprising intersecting oppositely angled surfaces 58 and 60 that form a temporary pointed ridge 62 at an outer side or head end of the insert and a section protruding from the rear of the head end that forms a temporary centrally located rib 64 of rectangular shape at an inner or back side of the insert. See FIG. 3. The retaining groove 44 in the transfer socket 40 is adapted to tightly receive the rib 64 on the extruded thermoplastic tear seam strip stock and the tear seam strip insert 22 is formed by installing a piece of this stock of suitable length on the transfer socket by forcing the protruding rib on the former into the retaining groove in the latter whereby the insert is forced by the pattern surface 42 and retaining groove 44 on the transfer socket to conform to the prescribed insert shape and is then held in this condition by the transfer socket on the powder box for movement into engagement with the mold surface of the shell tool.

With the tear seam strip insert 22 thus formed and held by the transfer socket 40 on the powder box, it is then accurately located and pressed by the transfer socket against the heated mold surface of the shell tool on connection of the powder box to the shell tool and casting of the thermoplastic powder as described above to form the skin. The pointed ridge 62 of the tear seam strip insert is pressed with a limited force against the heated mold surface by the transfer socket so that it is gradually deformed in a molten state by the heat of the mold surface and by the force of this engagement and prevents air entrapment between the tear seam strip insert and mold surface as the insert eventually thoroughly melts and joins with the surrounding layer of powder melt that forms the skin. See FIG. 5. In the process of melting, the pointed ridge 62 and all of the rib 64 of the insert are melted such that the insert fuses with the skin as it forms and only a narrow strip portion 66 of the insert remains at the mold surface that is intersected by a remaining portion of the angled surfaces 58 and 60 on the insert and is caused to conform to the mold surface. See FIGS. 5 and 6. In the final stage of melt with the rib on the insert melted and then on cooling to solidify the skin and insert melt, the skin is joined with the insert at the remaining portion of the angled surfaces 58 and 60 of the insert and smoothly blends with the remaining narrow portion 66 of the tear seam strip insert at the mold surface and also smoothly blends at the inner side of the skin with the inner side of the tear seam strip insert. See FIG. 6.

It is thus seen that both the transfer socket and tear seam strip insert provide extensive manufacturing flexibility in that the extruded elastomeric stock forming the transfer socket may be configured by its installation in a powder box to any suitable prescribed tear seam pattern for a particular shell tool mold surface and the extruded thermoplastic stock used to form the tear seam insert may be configured to any suitable prescribed tear seam pattern as the actual configuration and contour of the insert is determined by the transfer socket retainer and the contoured platform of the support structure that supports the retainer in a particular shell tool and powder box combination. This allows for a variety of differently configured transfer sockets associated with the powder boxes for different shell tools wherein a common or universal thermoplastic tear seam strip stock is adaptive to all of them in forming a prescribed tear seam strip insert form. This also allows for the tear seam pattern for a particular skin to be readily changed to a new or different pattern by simply changing the transfer socket retainer and support platform accordingly and installing a new piece of transfer socket stock. Another advantage in this method of incorporating a tear seam in the air bag cover skin is that the skin or shell including the tear seam is completely formed following the casting of the skin about the preformed tear seam strip insert.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. For example, the invention has been disclosed in respect to a U-shaped tear seam pattern but is also applicable to other tear seam patterns such as those of H and X-shape or some other suitable tear seam pattern. It is therefore to be understood that within the scope of the appended claims, the invention may be practiced otherwise than as specifically shown and described.

What is claimed is;

1. A method of making a thermoplastic air bag cover skin with a lesser strength thermoplastic air bag deployment tear seam insert comprising the steps of: forming a filled thermoplastic tear seam strip having an inner side with a protruding rib and having an outer side with oppositely angled surfaces that intersect to form a pointed ridge, conforming said tear seam strip with the use of said rib to a prescribed tear seam configuration to form a tear seam strip insert, holding said tear seam strip insert with said rib, pressing said pointed ridge of said tear seam strip insert with a limited force against a prescribed location on a heated air bag cover skin defining mold surface to prevent air entrapment between said heated mold surface and said tear seam strip insert and to eventually melt both said pointed ridge and all of said rib and conform a narrow portion on said outer side of said tear seam strip insert intersected by a remaining portion of said angled surfaces to a prescribed area of said heated mold surface, and casting thermoplastic powder against said heated mold surface and said remaining portion of said angled surfaces of said tear seam strip insert to form a thermoplastic air bag cover skin that joins with said remaining portion of said angled surfaces of said tear seam strip insert and smoothly blends with said narrow portion of said tear seam strip insert at said mold surface and also smoothly blends at an inner side of said skin with said inner side of said tear seam strip insert.

2. A method as defined in claim 1 further comprising the step of forming said tear seam strip from extruded strip stock.

3. A method as defined in claim 1 further comprising the step of extruding a filled thermoplastic urethane material to form said tear seam strip.

4. A method as defined in claim 1 further comprising the step of extruding a filled polyvinyl chloride material to form said tear seam strip.

5. A method as defined in claim 1 further comprising the step of extruding a filled polyolefin material to form said tear seam strip.

6. A method as defined in claim 1 wherein thermoplastic urethane powder is cast against said mold surface to form said skin.

7. A method as defined in claim 1 wherein thermoplastic polyvinyl chloride powder is cast against said mold surface to form said skin.

* * * * *